United States Patent Office 3,425,982
Patented Feb. 4, 1969

3,425,982
WATER SOLUBLE WINDING MANDRELS AND
METHOD OF MAKING THE SAME
Barry D. Fink, Fords, N.J., assignor, by mesne assignments, to the United States of America as represented by the Secretary of the Navy
Filed Apr. 2, 1965, Ser. No. 445,291
U.S. Cl. 260—41
Int. Cl. C08f 7/14; B28b 7/34
11 Claims

ABSTRACT OF THE DISCLOSURE

A water soluble, filament winding mandrel made by mixing AFS 70–100 foundry sand with a 50–50 water solution of polyvinyl-pyrrolidone so that said polyvinyl-pyrrolidone constitutes 7 percent-by-weight of the mixture, depositing the mixture in a suitable mold, and drying the mixture to solidify it. A hydrating agent may be added to the mixture prior to the drying to accelerate that step in the process by binding some of the water and thereby obviating its removal.

This invention relates to the art of filament winding. More particularly, the invention relates to a composition useful as a material for a mandrel for use in a filament winding machine.

Filament winding techniques are being used to make an increasing variety of composite structures, including such things as rocket motor cases and large railroad tank cars for carrying chemicals. Conventionally these techniques involve coating glass filaments with a suitable resin and controllably winding the resin-coated filaments on mandrels made of plaster. After the winding operation is completed and the resin is cured, the plaster mandrel is removed to obtain the desired hollow structure. The removal of the plaster mandrel from the structure requires painstaking hand work and sometimes results in damage to the product itself.

Accordingly, it is an obejct of the present invention to provide a composition, suitable for use as a mandrel material, that can, like plaster, be readily molded, but which can be removed much more easily than plaster.

Another object of the invention is to provide a water soluble mandrel material that can be easily removed by dissolution.

Still another object of the invention is to provide a mandrel material which will have optimum properties in compressive and flexural strength and which will retain its strength at the relatively high temperatures required to cure the plastic materials to be wound thereon.

A further object of the invention is to provide a method of making a mandrel having the properties abovementioned.

Briefly stated, the composition according to the invention is composed of foundry sand and at least 7 percent-by-weight polyvinyl-pyrrolidone resin. The mandrel is made by mixing AFS 100 foundry sand and polyvinyl-pyrrolidone, in a 50–50 water solution, in a suitable mixing machine and then molding the resulting mixture in a suitable mold. The composition is then solidified by drying it to remove the water vehicle. To accelerate the drying step, a hydrating agent may be added to the mixture to bind some of the water so that it need not be removed.

Figure 1:
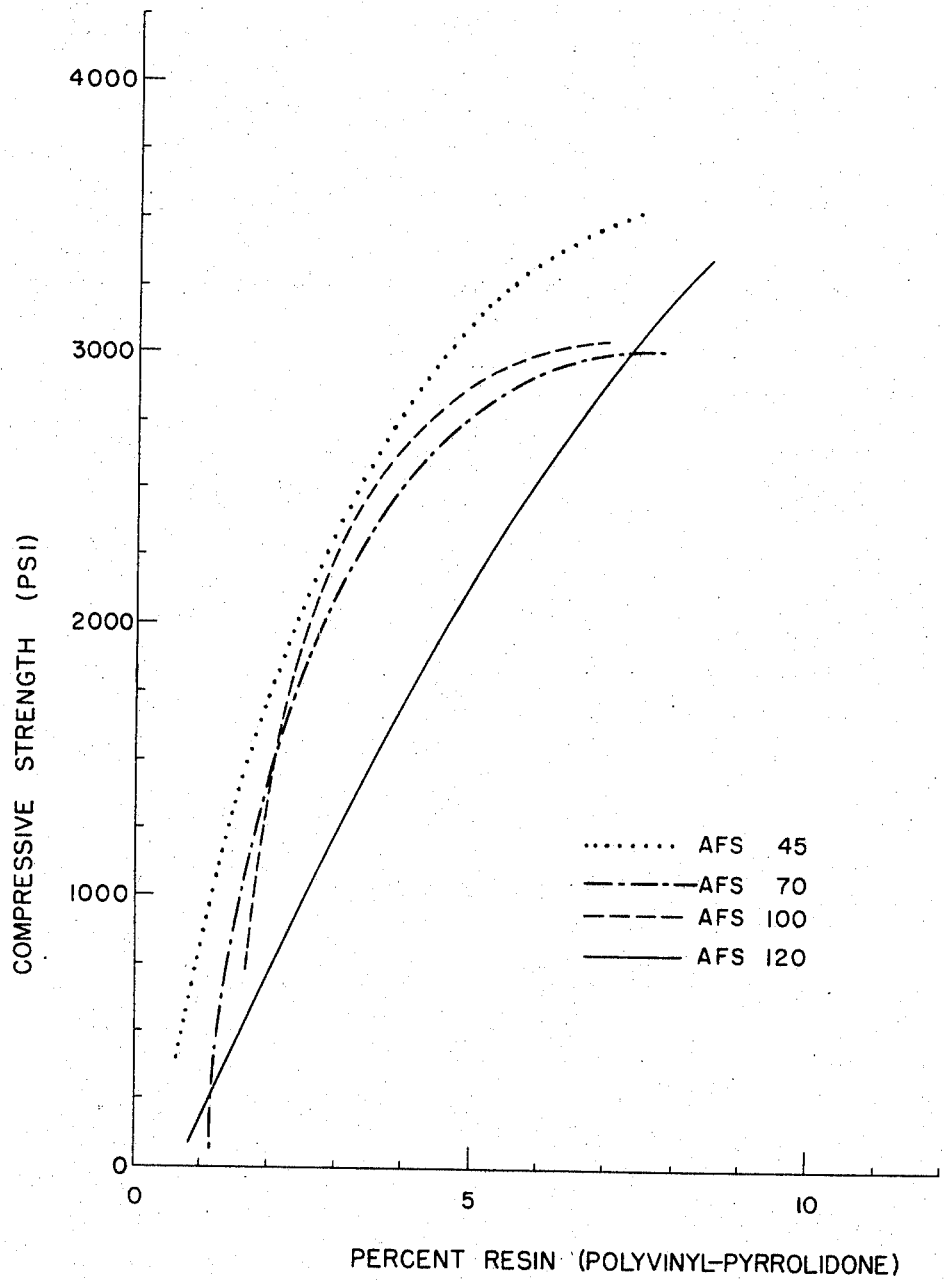
Figure 2:
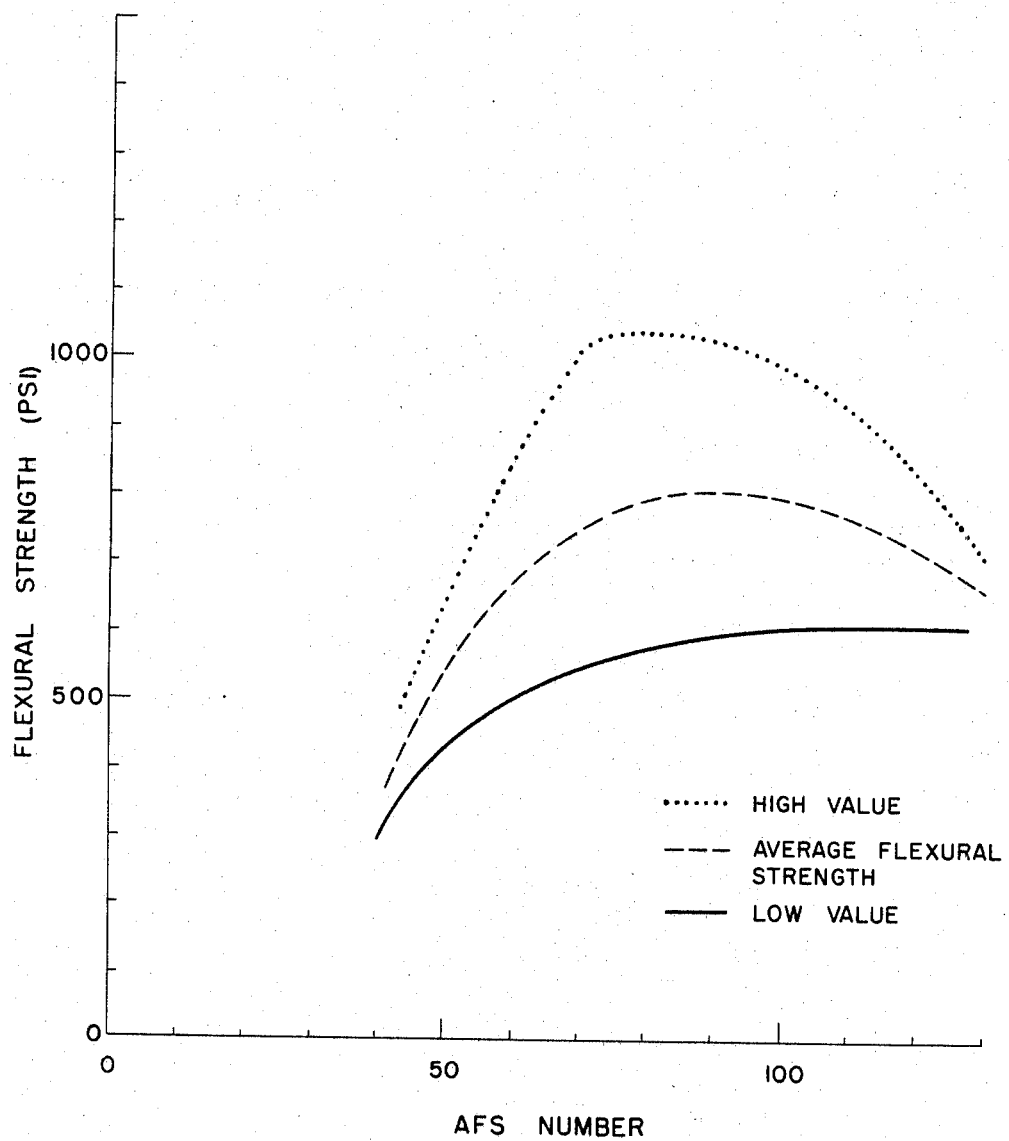

Other objects, advantages and new features of the present invention will become apparent from a reading of the following detailed description when read in conjunction with the accompanying drawings wherein:

FIG. 1 is a plot of compressive strength against percentage of polyvinyl-pyrrolidone resin for various grades of sand; and FIG. 2 is a plot of flexural strength against AFS number showing the flexural strength of various foundry sands with a resin content of 7 percent-by-weight.

A material suitable for a washout mandrel must be readily moldable into a structure strong enough to maintain its dimensions under the stresses exerted in the filament winding process. The material must also be capable of retaining its strength during prolonged exposure to relatively high curing temperatures. Finally, the material must be easily soluble in a liquid that will not damage the material of the plastic wound thereon and which will not present a safety hazard.

As stated above, the materials employed in the composition of the present invention are sand and a resin binder. The grade of the sand and the proportion of resin to sand are factors which are material when considered with respect to the compressive and flexural strength which is required of a suitable mandrel. FIG. 1 has been provided to demonstrate the relationship of compressive strength to standard sand grade and percentage of polyvinyl-pyrrolidone resin.

Foundry sand is graded according to AFS number, which designates the average particle size. The higher the AFS number, the smaller the particles. FIG. 1 contains plots of compressive strength against percentage of resin for four grades of foundry sand, namely coarse AFS 45, medium AFS 70 and AFS 100, and fine AFS 120. As can be seen in FIG. 1, three of the sand grades, AFS 45, 70 and 100 approach a maximum of compressive strength when the resin content is approximately 7%. The fourth sand grade, AFS 120, does not reach a maximum within test limits, and has the least compressive of the four at the 7% point. With increased resin content, AFS 120 sand begins to show poor working properties and was therefore rejected in the preliminary studies. On the basis of the FIG. 1 curves, a resin content of 7 percent-by-weight was chosen as the minimum practical for winding mandrels.

As stated above, it is desirable to obtain an optimum between compressive and flexural strength for the composite material. Under compression, for example, the major part of the load is exerted on the sand particles rather than on the resin binder, and it therefore follows that the strength factors determined by the sand are controlling. Note that the coarsest sand, AFS 45, shows the highest compressive strength in FIG. 1. In the case of flexural loads, the major part of the load is exerted on the resin binder, and the strength characteristics of the resin are controlling. Referring to FIG. 2, it will be observed that the flexural strength of the composition made with the AFS 45 sand has the lowest flexural strength of the group by an order of magnitude. The flexural strength average value curve has a maximum at approximately 90 units, in the range between AFS 70 and AFS 100. For the combination of optimum compressive and flexural strength therefore, the choice of sand grade is between AFS 70 and AFS 100. AFS 100 appears to lie closest to the maximum in flexural strength and this grade is preferred. The choice may also be controlled by other factors such as the availability of the desired grade on the market. Either of these two grades will give satisfactory properties.

The mandrels are prepared by a molding process. In the case of a rocket motor mandrel, there is usually an insulating liner in the motor between the propellant and the outside glass-fiber reinforced case. This liner itself may be used as the mold for the mandrel. For other articles, special molds are necessary.

The first step in the molding process is dissolving the resin in water in equal parts by weight. This results in a solution which is sufficiently fluid to mix readily with sand. The liquid and the sand are then mixed together in a standard foundry muller. Suitable proportions for the mixture are 100 parts sand, 7.5 parts resin and 7.5 parts water.

After the mixing operation is complete, the mixture is introduced into the mold. At this stage of the process, care must be taken to completely and uniformly compact the material into the mold. For optimum sand compaction, a tamping motion is preferred over a steady pressure. The mixture should be put into the mold and tamped in the smallest increments practical.

The mandrel is solidified by removing the water vehicle in a suitable oven such as a forced convection oven. The drying temperature and the rate of drying should be selected to prevent the water from evaporating too rapidly. If rapid evaporation is permitted, a foam-like structure develops that is weaker than its more dense homologue. A temperature of 250° F. is a safe temperature. Higher temperatures may be employed as long as care is taken to avoid the foam-like structure.

For extremely large mandrels such as those used to make rocket motors, the removal of the water vehicle by evaporation alone takes an extremely long time. It is possible to reduce the drying time by eliminating the solvent action of the water to make its removal unnecessary. Hydratable materials such as calcium chloride and anhydrous copper sulfate, for example, add water to their molecular structure and thus prevent the water from functioning as a solvent. Thus, the incorporation of such a material into the composite formulation will materially reduce the drying time.

Polyvinyl-pyrrolidone resin is the preferred binder. It has extremely good adhesive properties and excellent heat resistance. It has a high degree of solubility, which provides for good mixing and packing consistencies and minimizes the amount of water which has to be removed in the drying step. The melting point of this particular resin is above 300° F. and this fact indicates that at the temperatures required to cure the resin of the glass-fiber reinforced material which is wound on the mandrel, the mandrel will retain a high portion of its strength. While because of its ready availability, foundry sand is preferred as the filler, other lighter aggregates such as asbestos or fiberglass may also be used. The primary advantage of these aggregates would be to decrease the weight of the mandrel.

It will be apparent from the foregoing that a highly superior mandrel material has been described. Like the plaster mandrels of the prior art, this material can be readily molded but is much more easily removed after curing of the glass-fiber reinforced structure wound thereon. The polyvinyl-pyrrolidone in the amount of 7 percent by weight provides a composition having optimum structural properties. The material is capable of retaining its strength during prolonged exposure to the relatively high curing temperatures, approximately 300° F., required to cure the resin of the wound-up material.

Obviously there are modifications and variations of the invention which are possible in the light of the above teachings. It is therefore to be understood that within the scope of the appended claims the invention may be practiced otherwise than as specifically described.

What is claimed is:
1. A wash-out mandrel comprising:
   foundry sand in major proportion; and
   a binder of polyvinyl-pyrrolidone in the amount of at least 7 percent by weight.
2. The wash-out mandrel of claim 1 wherein said foundry sand is of a grade in the range of AFS 70 to AFS 100.
3. The wash-out mandrel of claim 2 further comprising a water vehicle for said binder.
4. The wash-out mandrel of claim 3 further comprising a hydrate forming substance for removing the solvent capability of at least a portion of said water vehicle.
5. The wash-out mandrel of claim 4 wherein said hydrate forming substance is calcium chloride.
6. The wash-out mandrel of claim 4 wherein said hydrate forming substance is anhydrous copper sulfate.
7. A wash-out sand mandrel consisting essentially of:
   AFS 100 foundry sand in major proportion, and
   a binder of polyvinyl-pyrrolidone in the amount of at least 7 percent by weight.
8. A method of making a wash-out sand mandrel for a filament winding machine comprising the steps of:
   dissolving polyvinyl-pyrrolidone resin in water to make a resin solution,
   mixing said solution with foundry sand in such proportion that the resulting mixture contains at least 7 percent by weight polyvinyl-pyrrolidone,
   partially filling a mold with said mixture,
   compacting said mixture in the mold,
   adding an additional quantity of said mixture to said mold,
   compacting said additional quantity,
   repeating said filling and compacting steps until said mold is filled, and
   heating said mold to remove the water vehicle.
9. The method according to claim 8 comprising the further step of:
   adding to said mixture a hydrating agent to remove the solvent capability of at least a portion of said water vehicle.
10. The method of claim 9 wherein said hydratable material is calcium chloride.
11. The method according to claim 9 wherein said hydratable material is anhydrous copper sulfate.

References Cited

UNITED STATES PATENTS

| | | | |
|---|---|---|---|
| 3,024,209 | 3/1962 | Ferrigno | 260—41 |
| 2,765,507 | 10/1956 | Wolf et al. | 260—41 |
| 2,817,128 | 12/1957 | Wickett | 260—41 |
| 2,872,433 | 2/1959 | Glickman | 260—29.6 |

SMAUEL H. BLECH, *Primary Examiner.*

W. J. BRIGGS, SR., *Assistant Examiner.*

U.S. Cl. X.R.

264—308; 156—155, 173; 260—29.6; 65—286